Patented Jan. 14, 1947

2,414,385

UNITED STATES PATENT OFFICE 2,414,385

HYDROXYLATION OF UNSATURATED ORGANIC COMPOUNDS CONTAINING AN ALCOHOL OR ETHER GROUP

Nicholas A. Milas, Belmont, Mass., assignor to Research Corporation, New York, N. Y., a corporation of New York No Drawing. Application March 16, 1942, Serial No. 434,983

10 Claims. (Cl. 260—600)

This invention relates to the catalytic oxidation of unsaturated organic compounds, and its principal object is to provide a simple, economical and efficient process of producing useful oxygenated organic compounds such as glycols, phenols, aldehydes, ketones, quinones and organic acids.

Further objects will be apparent from a consideration of the following description wherein I have illustrated the application of my new process in the preparation of various substances constituting the class of oxygenated organic compounds.

The invention, which is a continuation-in-part of my application Serial No. 382,273, filed March 7, 1941, is concerned with the hydroxylation of unsaturated aliphatic compounds containing olefinic or acetylenic linkages and composed of carbon, hydrogen and oxygen atoms only. This invention is more particularly concerned with the hydroxylation of unsaturated aliphatic compounds containing olefinic or acetylenic linkages and either the group

or the group

that is to say, carboxylic acid compounds, aldehydes, ketones, alcohols, or ethers of such unsaturated compounds.

I have found that when an unsaturated organic compound of the type above described is treated with hydrogen peroxide, in an initially substantially anhydrous environment, e. g., in the presence of an essentially anhydrous inert organic solvent, and of a small amount of a catalytically active oxide of a metal known to form very unstable peracids rather than peroxides, including Os, Ti, Zr, Tn, V, Nb, Ta, Cr, Mo, W, U and Ru, (see J. A. C. S., 59, pages 2342 and 2343; and Berichte, 41 (1908), page 3536), preferably osmium tetroxide, ruthenium tetroxide, vanadium pentoxide, molybdenum oxide or chromium trioxide,—in an essentially non-alkaline environment (that is, in the absence of an inorganic base), there is produced an oxygenated organic compound, the nature of which depends upon the particular type of unsaturated compound subjected to such treatment, the temperature, the pressure (if the compound treated be in gaseous phase), the solvent medium, the extent of oxidation and other such factors.

I have successfully produced substantially good yields of ethyl dihydroxybutyrate from ethyl crotonate, diethyl mesotartrate from diethyl maleate, diethyl racemate from diethyl fumarate, 2-methyl-pentene-diol-2,3-one-4 from mesityl oxide, glycolaldehyde from vinyl acetate, glycolaldehyde from divinyl ether, glycolaldehyde from vinyl bromide, 9,10-dihydroxy-stearic acid from oleic acid, β-phenylglycerol and di (β-phenylglycerol) ether from cinnamyl alcohol, glycerol from allyl alcohol, phenyl glyceric acid from cinnamic acid, dihydroxybutyric acid from crotonic acid, mesotartaric acid from maleic acid, racemic acid from fumaric acid, anisaldehyde and anisic acid from anethol, vanillin from isoeugenol, piperonal from isosafrole, homopiperonal from safrole, dihydroxystearic acid from oleic acid, etc.

In carrying out my process successfully, it is advisable to employ substantially anhydrous solvents, preferably selected from such organic substances that do not undergo oxidation during the reaction. Tertiary alcohols in general, and particularly tertiary butyl and tertiary amyl alcohols, have been found to be suitable solvents for this purpose, although it is to be understood that the invention is not confined to these solvents since various other reagents, such as nitriles and certain types of ethers, acetic acid-tertiary alcohol mixtures, etc., may be used to advantage. Illustrative of operable nitriles is acetonitrile. Illustrative examples of operable ethers include: ethyl, propyl, butyl and amyl dioxane, ethers of ethylene glycol and diethylene glycol, etc. Among operable inert (that is, unreactive) organic solvent media is nitromethane. The organic solvent employed is, in all cases, strictly a medium or vehicle, and is not a reactant.

The reaction mixture (material to be oxidized, the hydrogen peroxide treating agent, the organic solvent medium,—where used,—and the catalyst) preferably is initially substantially anhydrous.

A preferred procedure for the preparation of the hydrogen peroxide reagent in tertiary butyl alcohol is as follows:

400 cc. of pure tertiary butyl alcohol is added to 100 cc. of 30% hydrogen peroxide (Albone C), and the solution treated with small portions of anhydrous sodium sulphate, thereby forming two layers. The alcohol layer, containing most of the hydrogen peroxide, is removed. The so separated hydrogen peroxide-rich layer may be used without further treatment; however, I may further dehydrate the same by treating it with more anhydrous sodium sulphate, and finally with anhydrous calcium sulphate or magnesium sulphate. A solution containing approximately 6% hydrogen peroxide in tertiary butyl alcohol is thus obtained, and this solution may be concentrated by vacuum distillation of the alcohol at room temperature to any desired concentration without loss of the peroxide, provided an all-glass or other suitable apparatus is employed.

An osmium tetroxide catalyst may be prepared by dissolving substantially anhydrous osmium tetroxide in substantially pure tertiary butyl alcohol, free from isobutylene.

A chromium trioxide catalyst similarly may be prepared by dissolving substantially anhydrous chromic acid ($CrO_3$) in a substantially pure saturated tertiary aliphatic alcohol ($C_nH_{2n+1}$)$_3$COH, e. g., substantially pure tertiary butyl or amyl alcohol, or in a substantially anhydrous mixture of acetic acid and a tertiary alcohol; or, the substantially anhydrous $CrO_3$ may be added directly in the solid form to the substantially anhydrous medium containing hydrogen peroxide and the substance to be hydroxylated. Preparation of the other catalytic metal oxides may similarly be formed by dissolving the metal oxide in one or another of the organic solvents above stated. Or, the selected catalytic metal oxide may be added, in powdered or finely divided state, to the hydrogen peroxide reagent wherein the same eventually dissolves forming a completely homogeneous solution. The catalyst may be used alone or in combination.

I have found that the temperature plays an important role in directing the type of oxygenated product to be formed. For example, formation of glycols in high yields is usually favored between room temperature (e. g., 21° C.) and several degrees below 0° C., whereas aldehydes, ketones and organic acids are produced more advantageously at temperatures higher than room temperature (e. g., between 21° C. and the boiling point of the non-aqueous solvent employed).

The following examples are illustrative of the application of the invention:

1. GASEOUS UNSATURATED SUBSTANCE

For the production of ethylene glycol or of any glycol from any unsaturated gaseous substance, the latter may be bubbled through the peroxide reagent containing any one of the catalysts above suggested, or any combination of them, or it may be introduced under pressure of various magnitudes from one to several atmospheres or even several hundred atmospheres. The end of the reaction is usually indicated by a color change or by the complete utilization of the peroxide as determined by titration. The glycol or other products may be separated by fractionation or in any other suitable manner.

2. LIQUID AND SOLID UNSATURATED SUBSTANCES

(a) Hydrocarbons

The unsaturated hydrocarbons are dissolved or mixed with the peroxide reagent containing a suitable catalyst of the type previously suggested and the reaction is allowed to proceed either at or below room temperature if glycols are desired, or above room temperature if aldehydes, ketones and organic acids are desired. The hydrocarbons may be present preferably in the ratio of one mole to one or two moles of the peroxide, although greater excess of peroxide is necessary when aldehydes, ketones and acids are desired. The speed of the reaction up to certain limits depends upon the concentration of the catalyst which may be present preferably in concentrations from .05 g. to .5 g. per mole of the substance to be oxidized, although it is to be understood that these limits may at times be exceeded without affecting appreciably the yields of the oxygenated products. The end of the reaction is usually indicated by a color change or by the absence of peroxide. The glycols or other oxygenated products may then be separated either by fractionation or in any other well known manner.

(b) Miscellaneous

Using the same procedure as in the foregoing examples, I have produced 60% glycerol from allyl alcohol; 54% of $\alpha,\beta$-di-hydroxy butyric acid from crotonic acid; 56% of phenyl glyceric acid from cinnamic acid; 48% of racemic acid from fumaric acid; over 30% mesotartaric acid from maleic acid; 60% 9,10-dihydroxy stearic acid from oleic acid; 57% of diethyl racemate from diethyl fumarate; 55% of anisaldehyde from anethol; 66% of vanillin from isoeugenol; 68% yield of piperonal from isosafrole; and 44% of homopiperonal from safrole. In the case of some essential oils in which the double bonds are very active, the oxidation is apt to go beyond the glycol state, although it may be controlled to produce the glycol.

The invention is more particularly described and further illustrated in the following:

*Mesotartaric acid from maleic acid.*—To 2.9 g. (0.025 mole) of maleic acid were added 27.2 cc. (0.05 mole) of 6.3% solution of hydrogen peroxide in anhydrous tertiary butyl alcohol and 2 cc. osmium tetroxide solution in tertiary butyl alcohol, and the mixture was allowed to stand overnight at room temperature. The reaction was complete on the following day when the solvent was removed under reduced pressure and the residue dissolved in water. The solution was then made ammoniacal, heated to boiling and treated with excess 10% calcium chloride solution, whereby the calcium oxalate and mesotartrate precipitated out. This precipitate was removed, dried and weighed: yield 1.9 g. To remove the calcium mesotartrate, the precipitate was extracted with 20% sodium hydroxide solution. This separation yielded 1.2 g. of calcium mesotartrate and 0.7 g. of calcium oxalate. The calcium mesotartrate was further purified by reprecipitation and analyzed.

The yield of mesotartaric acid was 30.3%, and that of oxalic acid 14.6%, of the 1.9 g. of maleic acid consumed in the reaction.

*Vanillin from isoeugenol.*—Five grams of isoeugenol was mixed with 45 cc. of 6.3% solution of hydrogen peroxide in anhydrous tertiary amyl alcohol and 0.02 g. of vanadium pentoxide. The catalyst went into solution, which heated up spontaneously. The reaction was complete in about twelve hours when the mixture had become more intensely red. An analysis for the presence of vanillin by precipitating the p-nitrophenylhydrazone gave a yield of 66% of vanillin.

*Anisaldehyde from anethole.*—To 5 g. of anethole were added 45 cc. of 6.3% solution of hydrogen peroxide in anhydrous tertiary amyl alcohol and 0.02 g. of vanadium pentoxide. The catalyst went slowly into solution, which heated up almost to the boiling point of the solvent. The reaction was over in about two hours when the mixture became deep red and the peroxide had completely disappeared. Considerable amounts of acetaldehyde vapor came off during the reaction. The solvent was then removed under reduced pressure and the residue dissolved in glacial acetic acid. Aliquot parts of this were analyzed for anisaldehyde. The yield of anisaldehyde amounted to 55%. In addition to anisaldehyde some anisic acid was isolated from the reaction, and a small amount of a deep red solid which is presumably an addition product of vanadium pentoxide with anisaldehyde.

*Glycolaldehyde from vinyl acetate.*—To 17.7 g. of vinyl acetate (B. P. 72.5–73°), was added 110 cc. of 6.23% solution of hydrogen peroxide in tertiary butyl alcohol; the mixture was cooled to 0°, and to it was added 1 cc. of a solution of osmium tetroxide in tertiary butyl alcohol. After five days at 0° the reaction was complete (reaction mixture turned brown, and peroxide had completely disappeared), whereupon the reaction mixture was distilled to remove unconverted vinyl acetate and the solvent. There was obtained a yield of 60% of glycolaldehyde

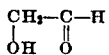

based on the amount of vinyl acetate consumed.

*9.10 dihydroxystearic acid from oleic acid.*—7 g. of oleic acid, B. P. 230–235 (21 mm.), was mixed with 14.3 cc. of a 5.95% solution of hydrogen peroxide in tertiary butyl alcohol; the mixture was cooled to 0°, and to it was added 0.5 cc. of a solution of osmium tetroxide in tertiary butyl alcohol. The solution became orange in color, but after standing over night at 0° it turned colorless and the reaction was complete. A considerable amount of 9,10-dihydroxystearic acid had precipitated. The solvent was removed under reduced pressure and the residue was washed thoroughly with ether to remove any unconverted oleic acid. The washed, solid, product was recrystallized from absolute alcohol; M. P. 129–131° (corr.). Its neutralization equivalent was found to be 319. The yield amounted to 60%.

*Phenylglycerol from cinnamyl alcohol.*—When a mixture of equimolecular quantities of cinnamyl alcohol and hydrogen peroxide (in the form of an initially substantially anhydrous solution thereof in tertiary butyl alcohol, said solution containing osmium tetroxide as the catalyst), maintained at about 0° C., is stirred for a period of four days, there is produced a reaction mixture containing phenyl-glycerol together with smaller quantities of mono-ethers of phenyl-glycerol. For isolating the phenyl-glycerol, the solvent is removed from the reaction mixture by vacuum distillation, and the solvent-free residue is fractionated to recover a fraction coming over at 171° C.

In the above example, benzaldehyde and glycol-aldehyde are formed, at the expense of the phenylglycerol, if the temperature of the reaction mixture is permitted to rise spontaneously.

*Glycolaldehyde from divinyl ether.*—For preparing divinyl ether 1 mol of the latter is reacted with peroxide reagent (containing osmium tetroxide as catalyst) in an amount corresponding to 1 mol of HOOH, at 0° C. About equal quantities of glycolaldehyde and acetaldehyde are thus formed, showing that only one of the double bonds of the starting material hydroxylates and that the resulting product then rearranges spontaneously.

Similarly, glycolaldehyde is produced by reacting equimolecular amounts of vinyl bromide and the peroxide reagent (containing osmium tetroxide as catalyst), at 5–10° C.

For preparing glycerol by the process of the present invention, 1 mol of allyl alcohol is added to an amount of peroxide reagent (containing osmium tetroxide as catalyst) equivalent to 1 mol of hydrogen peroxide, and the reaction mixture is maintained at not to exceed normal room temperature by external cooling. When the reaction is complete, the solvent is removed by vacuum distillation and the solvent-free residue is fractionated to separate glycerol from unreacted allyl alcohol and from the catalyst.

*Piperonal from Iso-safrole.*—Piperonal is produced, in 67.4% yield, from iso-safrole, by reacting 1 mol of the latter, at normal room temperature and without external cooling, with an amount of the peroxide reagent (containing vanadium pentoxide as catalyst) corresponding to 1 mol of hydrogen peroxide.

This application is a continuation-in-part of application Serial No. 136,600 through intervening application Serial No. 382,273.

I claim:

1. Process for the hydroxylation of an unsaturated organic compound containing an olefinic linkage and the group

which comprises treating the unsaturated compound with hydrogen peroxide in an initially substantially anhydrous liquid medium and in the presence of a catalytically active oxide of a metal which forms unstable peracids.

2. Process for the hydroxylation of an unsaturated organic compound containing an olefinic linkage and the group

which comprises treating the unsaturated compound with an initially substantially anhydrous solution of hydrogen peroxide in an inert organic solvent medium and in the presence of a catalytically active oxide of a metal which forms unstable peracids.

3. Process for the hydroxylation of an unsaturated organic compound containing an olefinic linkage and the group

which comprises treating the unsaturated compound with an initially substantially anhydrous solution of hydrogen peroxide in an inert organic solvent medium and in the presence of a catalyst selected from the group consisting of the oxides of osmium, ruthenium, vanadium, chromium and molybdenum.

4. Process for the hydroxylation of an unsaturated organic compound containing an olefinic linkage and the group

which comprises treating the unsaturated compound with an initially substantially anhydrous solution of hydrogen peroxide in an inert organic solvent medium consisting essentially of a tertiary monohydric saturated aliphatic alcohol and in the presence of a catalytically active oxide of a metal which forms unstable peracids.

5. The process defined in claim 2, in which the reaction is effected at a temperature, favoring formation of glycol derivatives, between normal room temperature and several degrees below 0° C.

6. The process defined in claim 2, in which the reaction is effected at a temperature, favoring formation of aldehydes, ketones and acids, between normal room temperature and the boiling point of the non-aqueous solvent medium.

7. Process for the hydroxylation of an unsaturated organic compound containing an olefinic linkage and an ether group, which comprises treating the unsaturated compound with hydrogen peroxide in an initially substantially anhydrous liquid medium and in the presence of a catalytically active oxide of a metal which forms unstable peracids, and recovering the polyhydroxy derivative of the unsaturated organic compound from the resulting reaction mixture.

8. Process for the production of vanillin from isoeugenol, which comprises reacting substantially equimolecular proportions of isoeugenol and hydrogen peroxide in an initially substantially anhydrous inert organic solvent medium and in the presence of vanadium pentoxide as catalyst for the reaction, and directly recovering vanillin from the resulting reaction mixture.

9. Process for the hydroxylation of an unsaturated organic compound containing an olefinic linkage and an hydroxyl group, which comprises treating the unsaturated compound with an initially substantially anhydrous solution of hydrogen peroxide in an inert organic solvent medium and in the presence of a catalytically active oxide of a metal which forms unstable peracids.

10. Process of making glycerol from allyl alcohol, which comprises reacting allyl alcohol with hydrogen peroxide in an initially substantially anhydrous inert organic solvent medium and in the presence of osmium tetroxide as catalyst for the reaction, and directly recovering glycerol from the resulting reaction mixture.

NICHOLAS A. MILAS.